United States Patent [19]

Dussinger et al.

[11] Patent Number: 4,887,176

[45] Date of Patent: Dec. 12, 1989

[54] DOUBLE-SIDED MAGNETIC RECORDING DEVICE SUPPORTING TWO TRANSDUCERS IN FIXED RELATION

[75] Inventors: Thomas E. Dussinger, Rush; John M. Riley, Rochester; Gerald J. Kosarko, Pavilion, all of N.Y.

[73] Assignee: Eastman Kodak Company, Rochester, N.Y.

[21] Appl. No.: 228,138

[22] Filed: Aug. 3, 1988

[51] Int. Cl.⁴ .............................................. G11B 5/54
[52] U.S. Cl. .................................. 360/105; 360/97.01
[58] Field of Search .................. 360/97.01, 99.01, 104, 360/105, 106; 369/263, 264, 244

[56] References Cited

U.S. PATENT DOCUMENTS

| | | | |
|---|---|---|---|
| 3,658,347 | 4/1972 | Cheesboro | 369/266 |
| 3,975,774 | 8/1976 | Helbers | 360/105 |
| 4,074,331 | 2/1978 | O'Reilly et al. | 360/104 |
| 4,085,428 | 4/1978 | Green et al. | 360/105 |
| 4,151,573 | 4/1979 | Landon et al. | 360/104 |
| 4,177,491 | 12/1979 | Jahn | 360/99 X |
| 4,180,832 | 12/1979 | Bixby | 360/106 |
| 4,305,145 | 12/1981 | Hughes et al. | 369/270 |
| 4,320,426 | 3/1982 | Thompson | 360/104 |
| 4,439,851 | 3/1984 | Kiguchi | 369/263 X |
| 4,482,993 | 11/1984 | Agostini | 369/263 |
| 4,578,727 | 3/1986 | Hills | 360/102 |
| 4,620,250 | 10/1986 | Hills | 360/102 |

FOREIGN PATENT DOCUMENTS 0034778 2/1988 Japan ................................... 360/105

Primary Examiner—Stuart N. Hecker
Assistant Examiner—David J. Severin
Attorney, Agent, or Firm—David M. Woods

[57] ABSTRACT

A double-sided recording device supports two transducers in fixed relation on opposite sides of a storage medium so that a fixed separation is maintained between the transducers. By making the separation substantially greater than the transducing cross-section of the medium, only one transducer at a time can effectively interface with the medium. Each transducer is mounted in a stabilizing device having an air bearing surface that promotes an effective interface through one-sided contact with the medium. In one embodiment, the medium is supported on a drive spindle that moves axially between two playing positions, one in which the medium is brought into operative relation with the first transducer and the other in which the medium is brought into operative relation with the second transducer. In another embodiment, the transducers are supported in fixed relation on a yoke that moves in relation to a fixed motor spindle.

8 Claims, 11 Drawing Sheets

DOUBLE-SIDED MAGNETIC RECORDING DEVICE SUPPORTING TWO TRANSDUCERS IN FIXED RELATION

BACKGROUND OF THE INVENTION

1. Field of the Invention

The invention generally relates to recording and/or reproducing apparatus for use with a flexible storage medium, such as a pliable magnetic disk, and, more particularly, to a double-sided recording device having magnetic heads disposed on opposite sides of the disk.

2. Description Relative to the Prior Art

Double-sided recording on a floppy disk has been used to increase capacity and facilitate data transfer operations. Contact is generally maintained on both sides of the disk at the same time and in the same general location. A typical double-sided contact system is disclosed by U.S. Pat. No. 4,151,573, which shows a fixed head on one side of a disk and a cantilevered, gimbal-mounted, movable head on the other side. In operation, the disk is confined againt the fixed head, despite perturbations in movment of te disk, by the pressure of the movable head.

Typically, the disk is contained within a protective plastic jacket. A shutter on the jacket is moved aside to reveal a windowed opening through which the heads can contact the disk. For double-sided recoding, inasmuch as the window is quite small, the heads are ordinarily in direct opposition or slightly offset in a radial direction to avoid flux interaction. This arrangement is desirable in any case because the disk, according to the prior art, is urged against one head by the force of the other—as further illustrated by U.S. Pat. No. 4,320,426, in which the disk is conformed to a wavy contour where it is captured between two radially offset heads.

If the radial offset is increased, other means must be provided to effectively capture the disk. For example, in the double-sided head structure described in U.S. Pat. No.4,074,331, each head employs a pressure pad positioned on the opposite side of the disk to urge the disk into recording contact with the head. As there are two heads and two pressure pads, when one head is selected to be operative, the other pressure pad is pivoted away from the disk and the other head loses effective contact with the disk.

A series of patent disclosures (beginning with U.S. Pat. No. 4,578,727—which discloses a single-sided contact recording device) describe a head stabilizing structure which achieves a stable, constant interface between a moving disk and a magnetic head without the necessity of backing the disk with a pressure member. Such a stable interface is established by surrounding the transducing surface of the magnetic head with a small, flat air bearing surface on one side of a stabilizer block. In companion U.S. Pat. No. 4,620,250, the air bearing surface is disposed at an angle with respect to the disk so that a leading edge of the air bearing surface penetrates slightly into the nominal plane of the rotating disk. This is believed to assist in the formation of strong coupling forces along the air bearing surface.

In Ser. No. 176,964, filed Apr. 4, 1988, this teaching is applied to a pair of oppositely-disposed stabilizer blocks that support opposed magnetic heads for simultaneously interfacing with opposite sides of a rotating magnetic disk. The flat, circumferential air bearing surface on each block generates coupling forces that deform the disk out of its nominal plane on opposite sides thereof and into intimate contact with the transducing gaps on the respective heads. The stabilizer devices are positioned in relation to separate radii depending from the center of the drive spindle so that a circumferential offset is established that permits substantially separate, but simultaneous, interaction of the air bearing surfaces with the disk.

The air bearing surface has been further refined both as to shape and composition in U.S. patent application Ser. Nos. 19,468 and 136,793 (filed respectively on Feb. 26, 1987 and Dec. 22, 1987, and both assigned to the assignee of the present invention). The stabilizer is accordingly improved by establishing an abrupt transition in the leading edge of the air bearing surface that penetrates the nominal plane of the moving disk. The transition appears to act as a fulcrum, generating a force that turns a section of the moving disk about the transition and flattens the disk down upon the head. This force contributes to the coupling forces seen in the prior devices. The stabilizer is further improved if made from a ceramic material, such as barium titanate. A stabilizer of such material is operative for long periods with relatively low frictional drag between the disk and the air bearing surface, a condition that lowers current draw upon the disk drive motor.

Double-sided recording using the above-described stabilizer blocks requires an offset between the air bearing surfaces so that a stable interface is maintained between each head and the disk. Unlike other forms of conventional double-sided recording, the opposed air bearing surfaces are intolerant of close interaction and must be displaced relative to each other if both are in simultaneous contact with the disk. This tends to take up quite a bit of space and can be a problem if the windowed opening in the jacket is too small to accommodate both stabilizer blocks.

SUMMARY OF THE INVENTION

In a general sense, a double-sided recording device according to the invention supports two transducers in fixed relation on opposite sides of a storage medium so that a fixed separation is maintained between the transducers during recording or playback operations. The separation is substantially greater than the transducing cross-section of the storage medium; that is, it is impossible for both transducers to effectively exchange signals with the disk at the same time. When used with the aforementioned stabilizer blocks, this separation prevents the opposed air bearing surfaces from interacting with each other and thus satisfies a requirement of such systems.

The transducers are brought into operative relation with the storage medium by establishing relative movement between the storage medium and the transducers. Such movement engages the recording device in either of two playing positions, the first playing position disposing the medium in operative relation with the first transducer (and away from the second transducer) and the second playing position disposing the medium in operative relation with the second transducer (and away from the first transducer). In one embodiment, the transducers are mounted in a fixed relation on a yoke that is supported for movement between the two playing positions. In another embodiment, which is preferred, a drive spindle and the medium therewith are moved axially of the drive spindle between the two playing positions.

BRIEF DESCRIPTION OF THE DRAWINGS

The invention will be described in relation to the drawings, in which.

DETAILED DESCRIPTION OF THE PREFERRED EMBODIMENT

Figure 1:
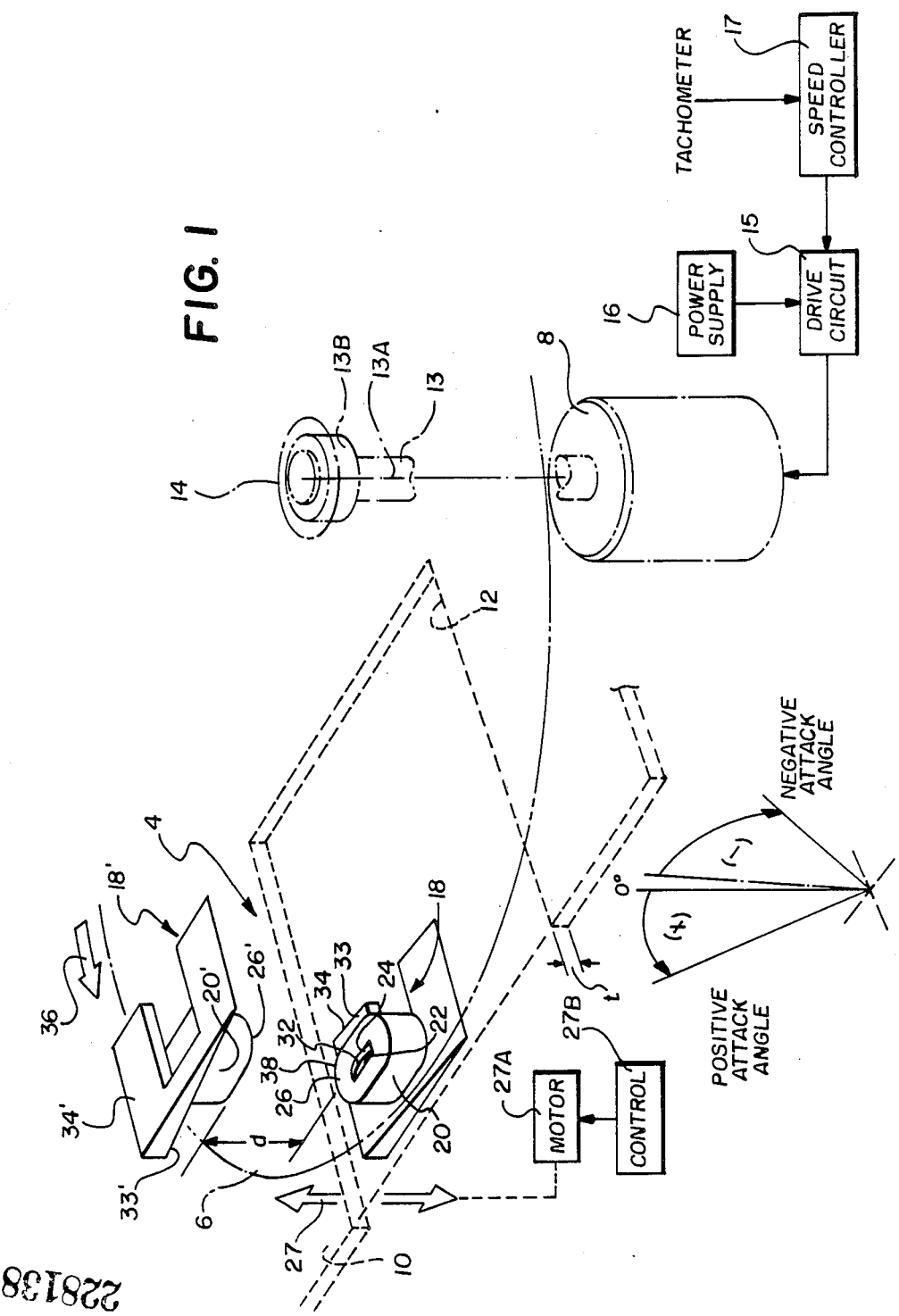
FIG. 1 is a perspective view of a double-sided recording device utilizing a pair of transducers that are supported in respective stabilizers on opposed sides of a disk in accordance with the invention.

Details of a double-sided stabilizer device 4 are shown by FIGS. 1, 2 and 3A and 3B. A magnetic disk 6 is enclosed for rotation within a jacket 10 (shown in broken-line in FIG. 1) having an opening 12 through which the stabilizer device 4 can access both sides of the disk 6. The disk 6 has a transducing cross-section that is less than the thickness t of the jacket 10; that is, a transducer (which will be described later) would ordinarily have to be within the transducing cross-section in order to effetively exchange signals with a recording layer on the disk 6. For double-sided recording, i.e., with two transducers, each transducer must be deployed within the transducing cross-section of the disk. A drive motor 8 has a shaft 13 centered on a drive axis 13A and terminating in a drive spindle 13B connecting to a hub 14 that is securely attached to an inside periphery of the disk 6. Current for the motor 8 is supplied by a drive circuit 15, which is connected to a power supply 16. For example, the motor 8 may be a brushless dc motor and the drive circuit 15 would provide electronic commutation of the motor. Feedback from a tachometer or like reference signal generator is provided to a speed controller circuit 17 for controlling the speed of the motor 8.

The double-sided stabilizer device 4 includes a lower stabilizer device 18 disposed relative to a lower side of the disk 6 and an upper stabilizer device 18' disposed relative to an upper side of the disk 6. (Since the stabilizer devices 18 and 18' are substantially identical except for their orientation, components of the upper device 18' will be designated with a prime (')). The stabilizer device 18 (18') includes a stabilizing block 20 (20') having an opeing 22 (22') for exposing a magnetic head 24 (24') to the surface of the disk 6. A circumferential, flat air bearing surface 26 (26') surrounds the opening 22 (22') on the side of the block 20 (20') that faces the disk 6. The stabilizer devices 18 and 18' are mounted in fixed relation so that air bearing surfaces 26 and 26' are separated at their nearest dimension by a fixed distance d that is greater than the thickness t of the jacket 10. The stabilizer devices 18 and 18', and the disk 6, are supported for relative movement between a first playing position (FIG. 3A) and a second playing position (FIG. 3B). In FIG. 1, this relative movment is depicted by a dual-directed arrow 27 and allows for two types of movement: a movement of the disk 6 relative to the stabilizer devices 18 and 18', as shown in FIGS. 6-9, or a movement of the stabilizer devices 18 and 18' relative to a fixed disk 6, as shown in FIG. 10. A motor 27A provides for either type of movement, that is, movement of the disk 6 or movement of the double-sided stabilizer device 4. The selection of a particular side of the disk 6 for recording or playback is controlled by a control circuit 27B, which directs the motor 27A to bring the disk 6 and the stabilizer devices 18 and 18' into the appropriate playing position.

Figure 2:
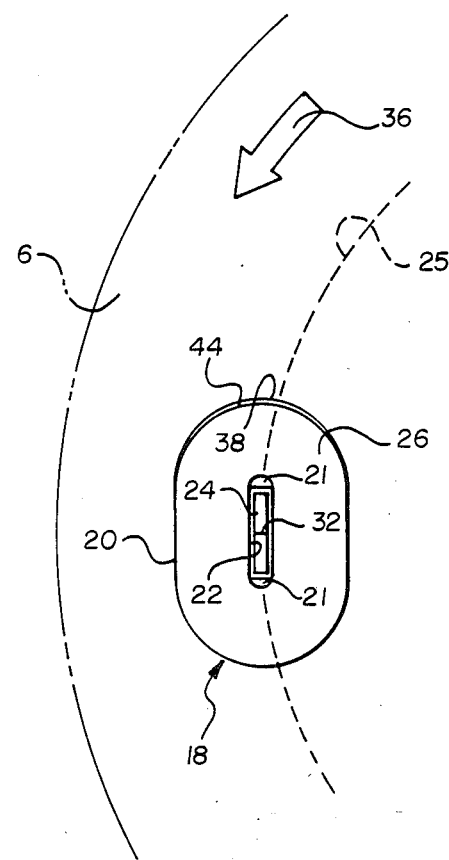
FIG. 2 is a plan view of one of the stabilizers of FIG. 1.

The block 20 (20') is made of a hard ceramic material having a moderate degree of surface roughness—on the order of 10 Å or greater as characterized by conventional root-mean-square measurement of surface height with a phase-shift interference microscope. The preferred material is a conductive barium titanate ($BaTiO_3$) available from Kyocera Corporation (Kyoto, Japan) as material item number T793H. Though the circumferential surface 26 (26') is shown to be oval in shape, other shapes are also believed to provide a similar stabilizing effect. As best shown in FIG. 2 for the lower stabilizer 18, the head 24 follows a circular trace 25 during recording and repeatedly follows the same trace 25 during reproduction. Because two heads 24 and 24' are in use alternately, each trace corresponds to a pair of tracks on opposite recording layers of the disk 6; for example, the paired tracks may correspond to a single video picture (e.g., a video field on opposite sides thereof) in a still video recording/reproduction system, or to video and audio in a still video system, or to data tracks in a data storage system. It is not necessary, however, that the paired tracks be directly opposite each other. There may be an advantage, for example, in offsetting the tracks in a radial direction to avoid undesirable interaction.

Figure 3A:
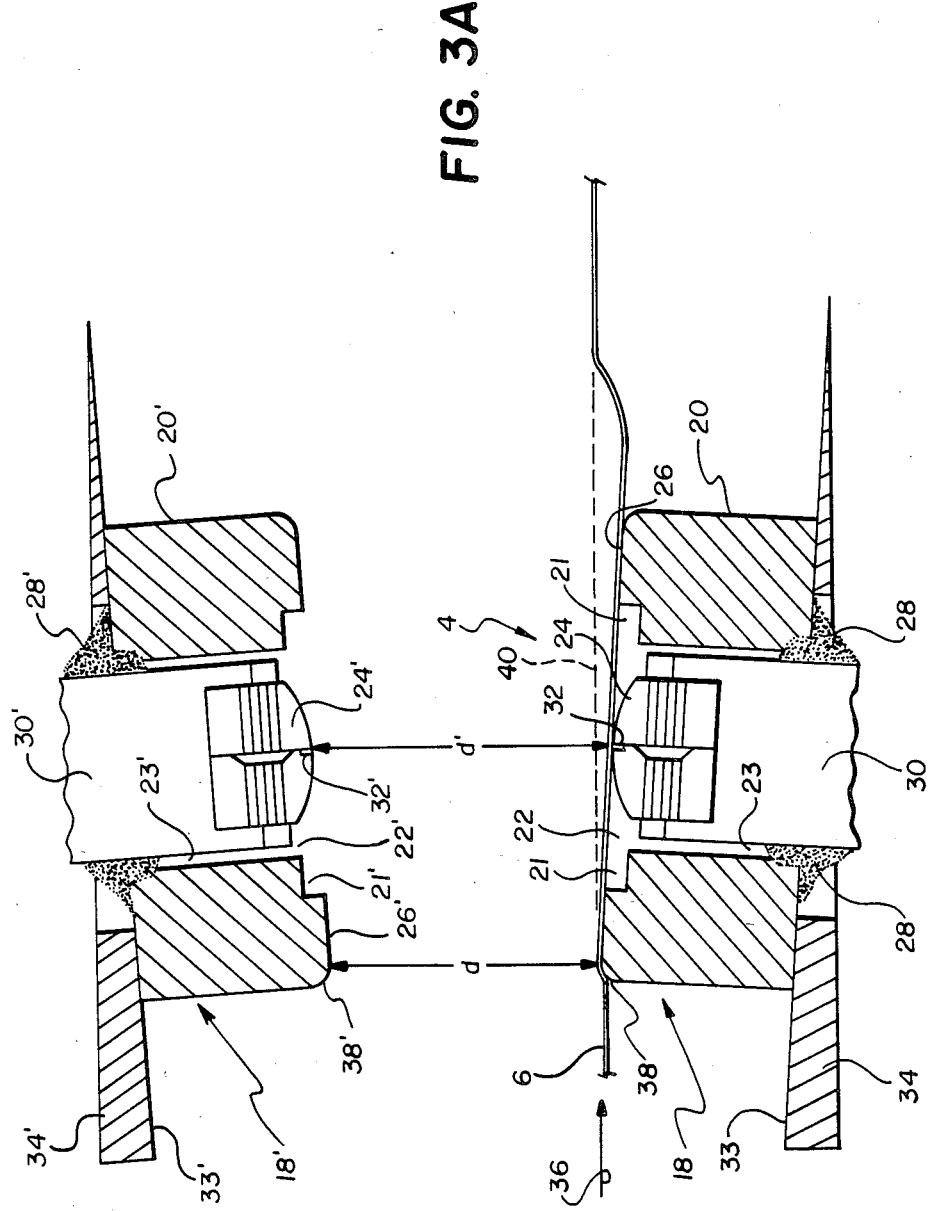
FIGS. 3A and 3B are cross-sectional views of the opposed stabilizers of FIG. 1 in two playing positions.
Figure 3B:
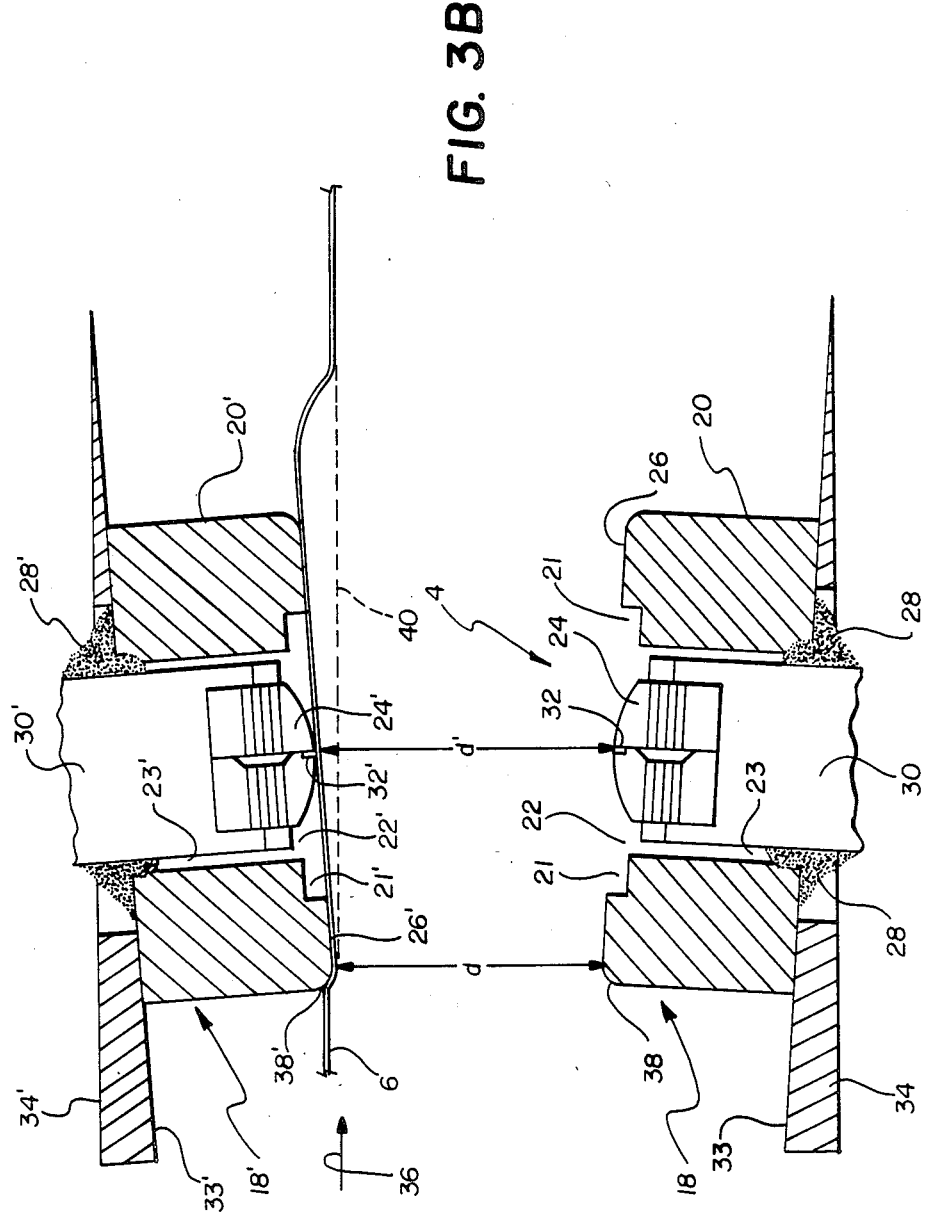

As best shown by FIGS. 3A and 3B, the opening 22 (22') leads to a cavity 23 (23') in the block 20 (20'). A non-magnetic potting compound 28 (28'), such as epoxy, supports a shoe 30 (30') within the cavity 23 (23') in relation to the stabilizing block 20 (20'). The head 24 (24') is mounted on the shoe 30 (30') to locate a magnetic gap 32 (32') in relation to the opening 22 (22') so that the gap 32 (32') slightly protrudes above the plane of the air bearing surface 26 (26'). FIGS. 2, 3A and 3B also show a step 21 (21') recessed about 0.005 inches below the air bearing surface 26 toward the edge of the opening 22 (22'). This step is believed to assist in the generation of coupling forces between the disk 6 and the head 24 (24'), as well as acting to at least somewhat reduce frictional drag and current draw on the drive motor.

The stabilizing blocks 20 and 20' are supported with respect to the disk 6 along the flat inclined surfaces 33 and 33' of a pair of wedge-shaped supports 34 and 34'—(or any other kind of like support)—mounted in fixed relation to each other so that the air bearing surfaces 26 and 26' are separated by the fixed distance d. The heads 24 and 24' are accordingly mounted in fixed relation to each other and their magnetic gaps 32 and 32' are separated by a fixed distance d' (as is shown in FIGS. 3A and 3B). The distance d' is substantially greater than the transducing cross-section of the disk 6. (The transducing cross-section is defined for purposes of this application to include the thickness of the disk 6 and a surrounding area on either side thereof in which the heads 24 and 24' can effectively interface with the disk 6 and effectively exchange signals with a recording layer on each side of the disk 6). As a result of the separation distance d', both heads 24 and 24' cannot effectively exchange signals with the disk 6 at the same time. In the embodiment shown by FIG. 1, the distance d' is also greater than the thickness t of the jacket 10. As shown by FIG. 1, the support 34 and thus the stabilizing block 20 are disposed at a particular angle (the attack angle) with respect to the nominal plane of the rotating disk. (The nominal plane is the plane established by the rotating disk absent any interference.) The other stabilizing block 20', which is directly opposite the block 20 in relation to the moving disk 6, is disposed at a like angle with respect to the nominal plane as seen from the other side of the disk 6. While the precise dimensions of the stabilizer are not critical and may vary depending upon the size of the disk, head structure, etc., the particular dimensions used in connection with a preferred dual track configuration (which will be described in connection with FIG. 5) for recording fifty circular tracks on a disk 47 mm in diameter include (referring to FIG. 5) an approximate length L of 0.328 inches and width W of 0.250 inches.

When the magnetic disk 6 is rapidly rotated by the drive motor 8 in a direction shown by an arrow 36, successive portions of the disk 6 are in substantial contact with a leading curved edge 38 (38') of the flat air bearing surface 26 (26'). (The term "substantial contact", as here used, allows for a narrow channel between the disk and each stabilizer device which is believed to permit the passage of a thin film of air.) The angle of the wedge-shaped support 34 (34') relative to the disk 6, which defines the attack angle, limits penetration of the leading curved edge 38 (38') into the plane of the disk 6. The extent of penetration is generally quite small, e.g., 0.006 in. Preferably the attack angle should be as small as possible to prevent excessive wear of the transducing and/or disk surfaces. In the preferred embodiment, both air bearing surfaces 26 and 26' are disposed at a negative angle of attack of 2.0° in relation to the nominal plane 40 of the disk 6.

Figure 4A:
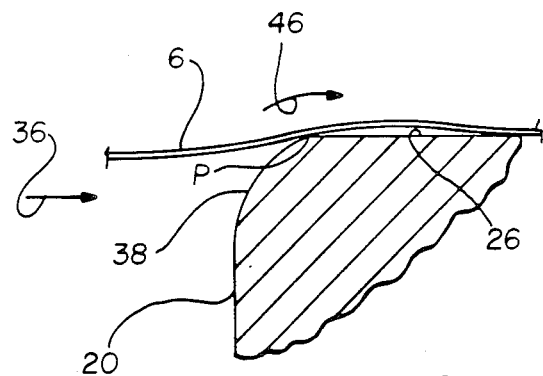
FIGS. 4A and 4B are detailed views of a leading edge portion of one of the stabilizers of FIG. 3A (or FIG. 3B), one figure showing the interface between the medium and the stabilizer and the other figure showing the angular configuration of the leading edge.
Figure 4B:
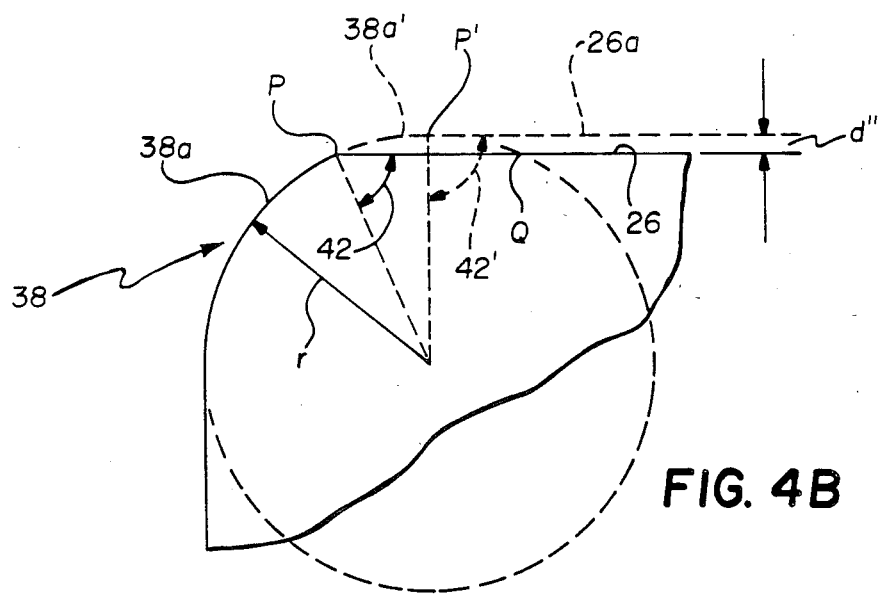

As shown by FIG. 4B in connection with the stabilizer device 18, a portion 38a of the leading edge 38 is defined by a radius r (r=0.012 in. according to the preferred embodiment) up to a certain point P, where the smoothly varying surface 38a abruptly meets the flat air bearing surface 26 in a non-tangential transition. The edge-tracing radius r meets the air bearing surface 26 at an included angle 42 that is acute. As further shown by broken line in FIG. 4B, if the radius r is allowed to further trace a surface to point P', the point of joining with the flat surface 26a (parallel to surface 26) would be in tangential relation, that is, the line defined by the surface 26a would be tangent to the circle described by radius r. When the leading edge 38 is subjected to an abrupt transition at the point P, it can be seen that the air bearing surface 26 coincides with a chord PQ of the circle defined by the radius r. In the preferred embodiment, the perpendicular distance d" of this chord PQ from the broken line surface 26a is between 0.003 and 0.005 inches. A stabilizer with the non-tangential transition P may be obtained by starting with a stabilizer of the type having a continuation 38a' of the leading edge 38a, as shown in FIG. 4B, leading into the surface 26a. Then the surface 26a is lapped by conventional techniques until the thickness d" is removed and the lapped surface coincides with the air bearing surface 26 shown in FIG. 4B. Though not particularly set forth in the figures, the leading edge 38' of the stabilizing device 18' is configured the same as the leading edge 38 described in connection with FIG. 4B.

As better shown by FIG. 2, the transition point P is one of many points defining a curved line 44 that first meets the surface of the disk 6 as it is rotated over the penetrating leading edge 38 of the stabilizer 18. (The same is true of the stabilizer 18', which is not shown in FIG. 2.) This curved line 44, again shown as a point P in FIG. 4A, serves as a fulcrum about which the contacting section of the disk 6 attempts to rotate. Though the precise mechanism is not well established, it is believed that a torque force is generated according to an arrow 46 (FIG. 4A) that attempts to twist the disk 6 clockwise. This force serves to deflect the disk 6 from its nominal plane 40 firmly upon the air bearing surface 26.

As heretofore described, the two stabilizer devices 18 and 18', together with their included magnetic heads 24 (24'), are disposed on opposite sides of the magnetic disk 6 for recording and playback of signals in relation to both magnetic recording surfaces of the disk 6. Both stabilizer devices 18 and 18', and therefore both heads 24 and 24', are supported in fixed relation to each other so as to maintain the gap separation distance d', at least during recording and playback operations. (It may be desirable to separate the heads 24 and 24' further, by means not shown, when the cartridge 10 is inserted or removed.) The fixed separation d' is maintained by, for example, fixedly attaching the stabilizer devices 18 and 18' to a frame (shown in connection with FIGS. 6-9) of the double-sided recording device. Thus the stabilizer devices are both immobilized in relation to the disk 6. The heads 24 and 24' are brought into operative relation with the disk 6 and a signal interface is established by moving the disk 6 between the stabilizer devices 18 and 18'. The alternative is to mount the stabilizers 18 and 18' on a common yoke for movement therewith, so that if one head is moved into operative relation with the fixed disk so must the other stabilizer move out of operative relation. In either case, a first playing position is shown in FIG. 3A in which the disk 6 is disposed in operative relation with the head 24, that is, in a position in which the head 24 can exchange signals with the disk 6. FIG. 3B shows the second playing position in which the disk 6 is in operative relation with the head 24'. It should be clear from these figures that either the disk 6 is moved in relation to immobilized stabilizer devices 18 and 18' or the paired (and fixed) stabilizer devies are together moved in relation to an axially immobile disk 6.

FIGS. 6-9 show the presently preferred embodiment in which the disk 6 is moved relative to the immobilized stabilizer devices 18 and 18'. The double-sided recording device includes, as shown initially in FIG. 6, a skeletal structure shown in part as a frame 60 and a carriage 62 supported for movement relative to a guiding flange 64 of the frame 60. Structural members integral with the frame 60 (but not specifically shown in FIGS. 6-9) support the stabilizing devices 18 and 18' in fixed relation to each other and, concomitantly, in fixed relation with the frame 60. A stepper motor 66 and a gear box 68 enclosing one end of a shaft 70 extending from the motor 66 are also mounted in fixed relation to the frame 60. The gear box 68 supports a worm shaft 72 for engagement with a worm gear 74 (shown in broken line) on the end of the motor shaft 70. A stepper control unit 77 energizes the stepper motor 66 according to user input instructions or to input signals from a control processor (not shown) in the recording device.

The carriage 62 supports a cartridge guide 76 for pivoting movement between two positions by attachment to an upstanding lug 78 extending from one end of the carriage 62. The jacket 10 and the disk 6 therewith are inserted into an open end 80 of the cartridge guide 76 until the jacket 10 is seated opposite locating pins 82 and 84. The cartridge guide 76 pivots between an insert and eject stage shown in FIG. 6 and the two-positions operating stage shown in FIGS. 7 and 8 (in which the pins 82 and 84 engage matching holes in the jacket 10). The carriage 62 further supports the drive motor 8 and positions the motor spindle 13B for engagement with the hub 14 through an opening 86 in the cartridge guide 76 (and a like opening in the jacket 10). The carriage 62 has a lateral flange 88 with a threaded aperture 90 for geared engagement with a threaded end 72' of the worm shaft 72.

Figure 6:
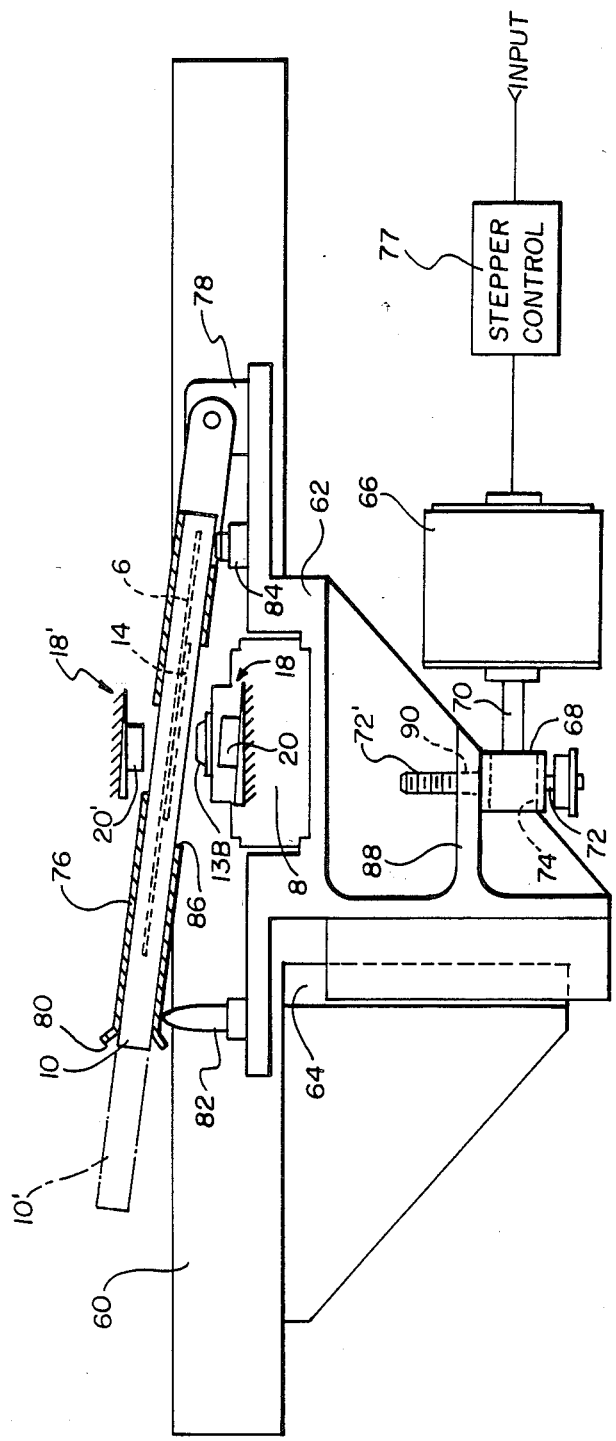
FIG. 6 is a side elevation of a carriage for supporting the disk for movement between the two playing positions, showing also a cartridge guide for receiving the jacket enclosing the disk.
Figure 7:
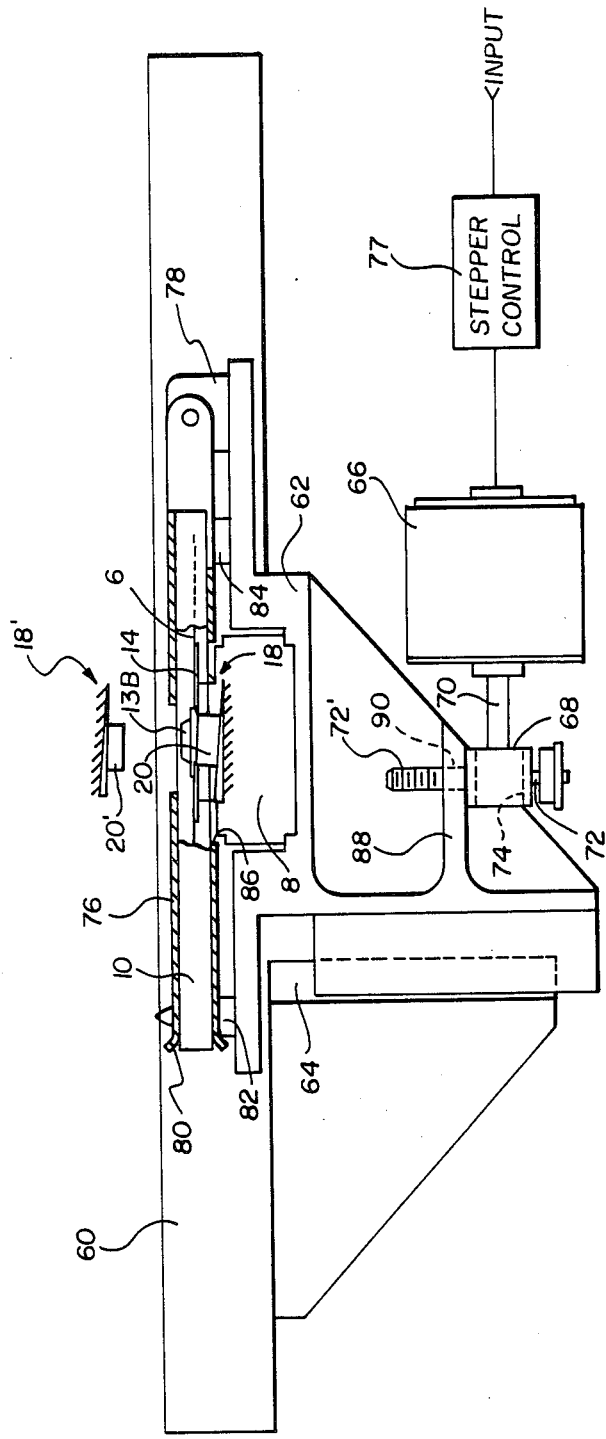
FIG. 7 is a side elevation similar to FIG. 6 showing the carriage in the first playing position.

In operation, the jacket 10 is inserted into the open end 80 of the cartridge guide 76—a movement shown in part by the broken line 10' in FIG. 6. After the jacket 10 is fully seated in the guide 76, the guide 76 is pivoted from the insert and eject stage (FIG. 6) to the first operating position in contact with the lower stabilizer device 18 (FIG. 7). This is the first playing position (FIG. 3A) in which the head 24 is in contact with the disk 6. At the same time, the motor spindle 13B is brought into engagement with the hub 14 and the motor 8 is energized to rotate the disk 6. Movement to the second playing position (FIG. 3B) is initiated by instructions to the stepper control unit 77, which activates the stepper motor 66 and rotates the worm shaft 72. The threaded connection of the threaded end 72' of the worm shaft 72 and the aperture 90 in the flange 88 causes the carriage 62 to move toward the second playing position shown in FIG. 8. The disk 6 accordingly moves axially of the motor spindle 13B as the motor 8 and the spindle 13B therewith move relative to the frame 60. The lower recording surface of the disk 6 disengages with the lower head 24 and the upper recording surface of the disk 6 interfaces with the upper head 24'. The carriage 62 is returned to the first playing position (FIGS. 3A, 7) by an appropriate instruction to the stepper control 77 that initiates the inverse of the previous procedure.

Figure 8:
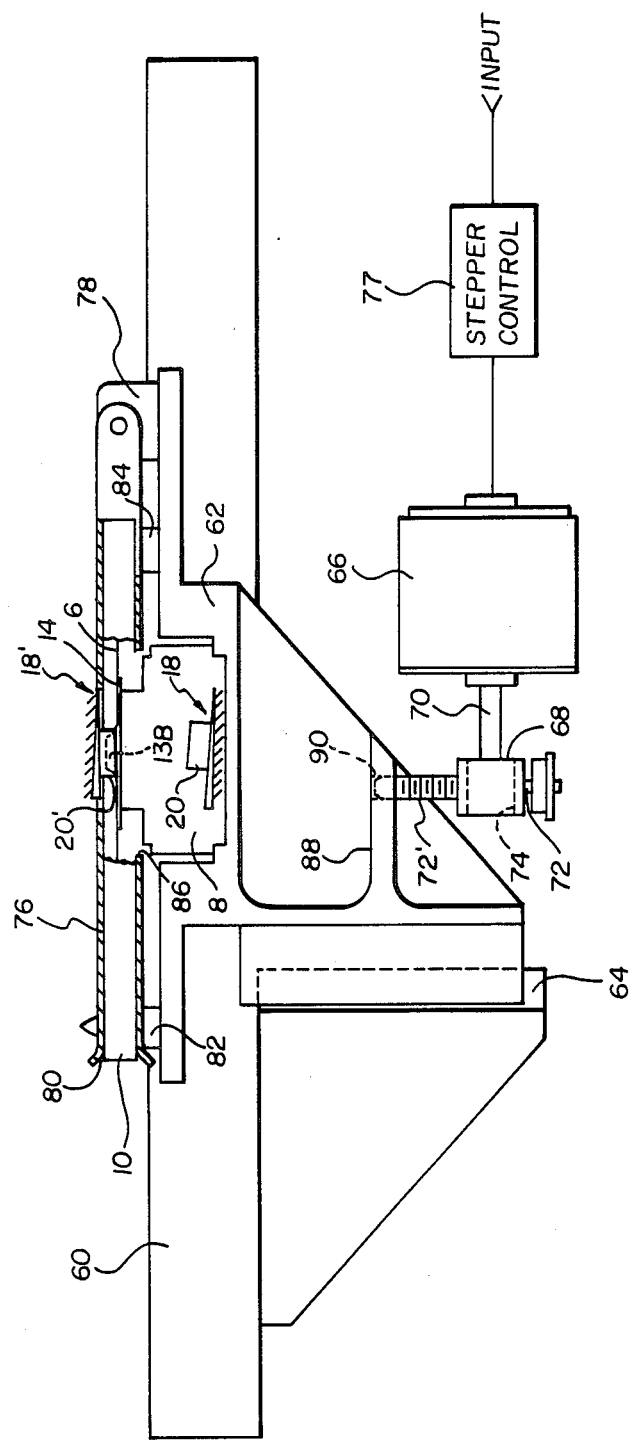
FIG. 8 is a side elevation similar to FIG. 6 showing the carriage in the second playing position.
Figure 9:
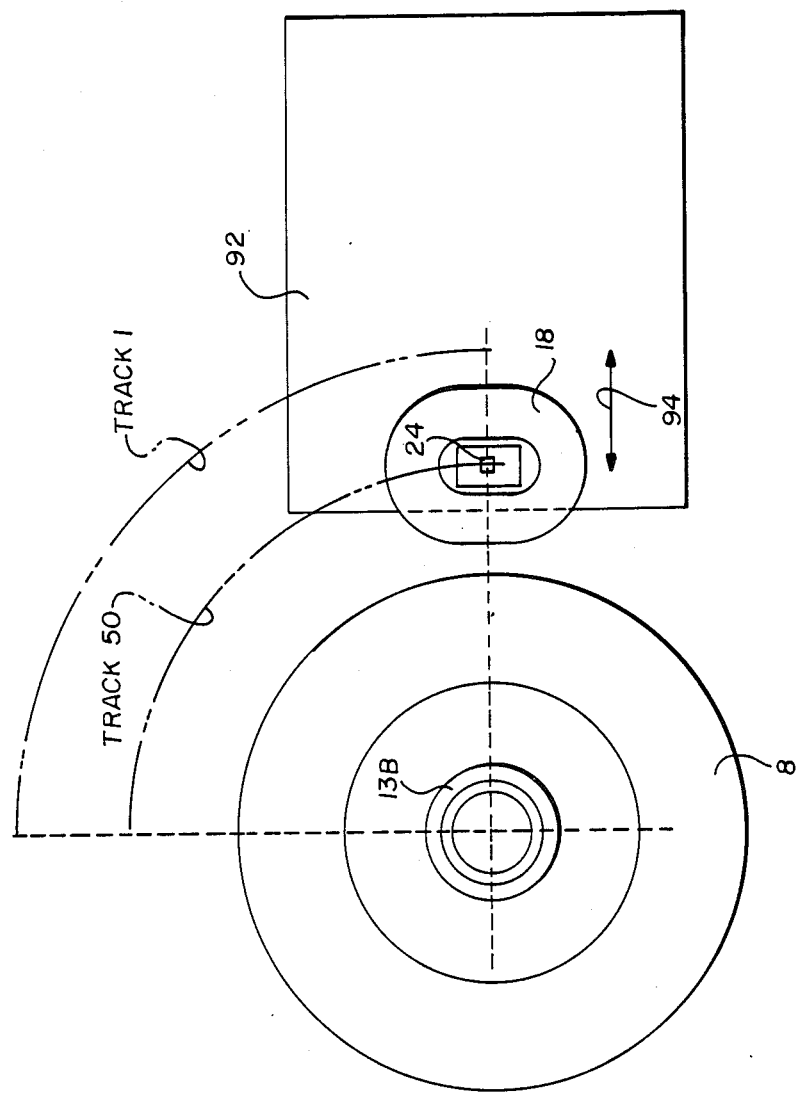
FIG. 9 is a plan view of the carriage of FIG. 6, showing the spatial relationship of the motor spindle and the transducers.

FIG. 9 is a plan view of a portion of the apparatus shown in FIG. 6, 7 and 8, showing in particular the spatial arrangement of the drive motor 8, the drive spindle 13B and the lower stabilizing device 18. FIG. 9 also shows the location of the head 24 in relation to one track of many on the disk 6, in particular to a track 50. The relative orientation of a track 1 is also shown. The stabilizing device 18 is mounted on a sled 92 that is supported for movement as indicated by an arrow 94 so that the head 24 may interface with a selected track (i.e., track 1 ... track 50). Thus, the stabilizing devices 18 and 18', which are immobilized in relation to axial movement, are nonetheless capable of movement radially across the disk 6 and orthogonal to the axial direction.

Figure 10A:
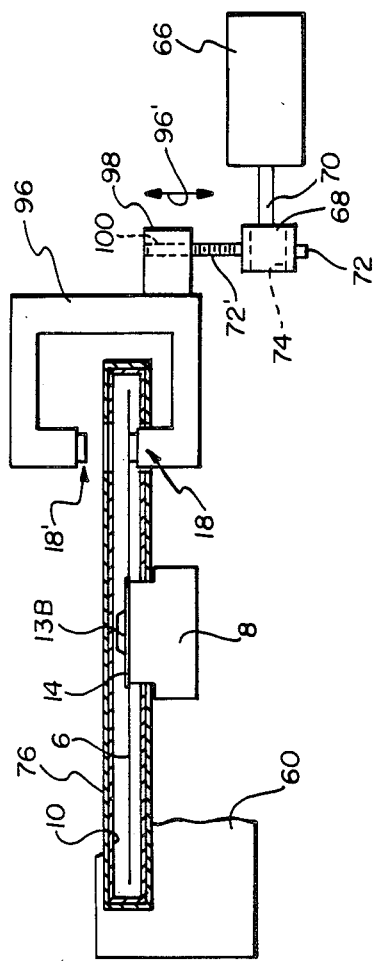
FIGS. 10A and 10B are illustrations of a second embodiment in which the transducers are mounted on a yoke for movement between the playing positions.
Figure 10B:
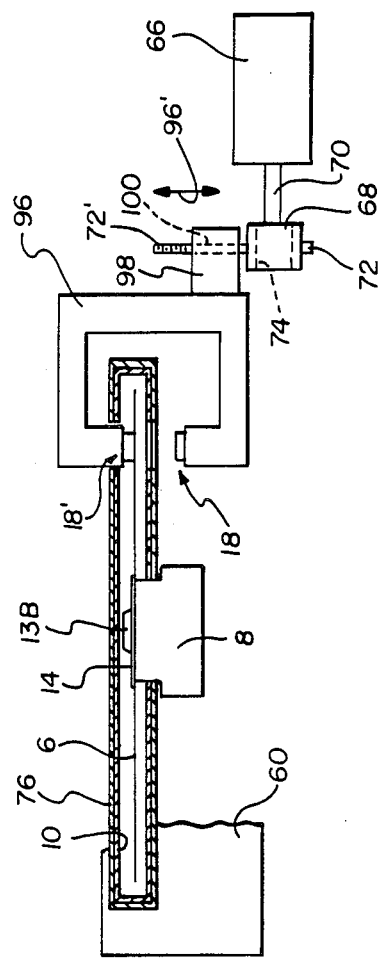

FIG. 10 shows an alternative embodiment of the invention in which the disk 6 is axially stationary and the stabilizers 18 and 18', and the heads 24 and 24' (not shown in FIG. 10), move in relation to the disk 6 between the first and second playing positions. The embodiment of FIG. 10 uses the same reference characters as used in FIGS. 6-8 to identify similar components. The drive motor 8, however, is mounted to the frame 60 so as to be axially immobile. A yoke 96 supports the stabilizers 18 and 18' in fixed relation for bidirectional movement as shown by an arrow 96'. A block 98 depending from the yoke 96 includes a threaded aperture 100 for engaging with the threaded end 72' of the worm shaft 72. In operation, the stepper motor 66 turns the worm shaft 72 and moves the yoke 96 into the first playing position shown in FIG. 10A. In this position, the stabilizer device 18 contacts the disk 6 and the head 24 can exchange signals with the bottom recording layer on the disk 6. To reach the second playing position shown in FIG. 10B, the stepper motor 66 is reversed and the yoke 96 is moved oppositely until the stabilizer device 18' contacts the disk 6 and the head 24' can exchange signals with the disk 6.

Figure 5:
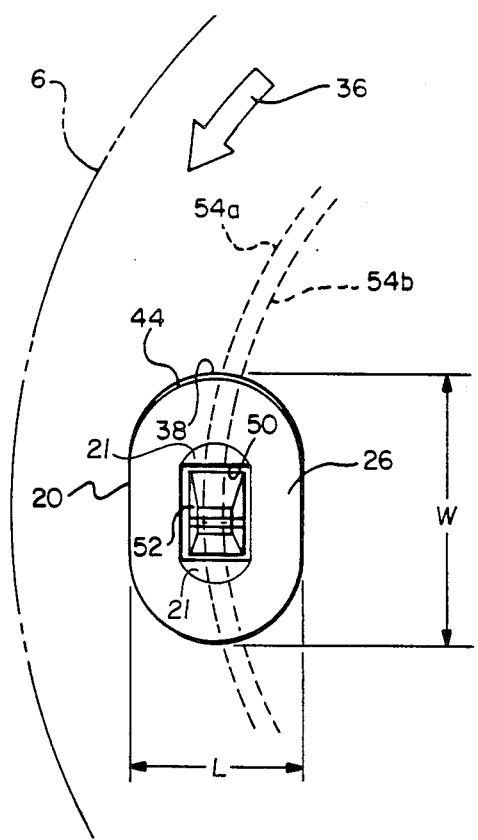
FIG. 5 is a plan view similar to FIG. 2 but of a stabilizer that supports a dual-track thin film head.

FIG. 5 shows the preferred application of a stabilizer in combination with a dual gap head. The stabilizer has an opening 50 large enough to accommodate a dual gap head 52 for generating two traces 54a and 54b on the disk 6. FIG. 5 also shows a plan view of the 0.005 inch recess 21 (21') mentioned in connection with FIGS. 3A and 3B. Furthermore, different types of head structure may be accommodated. For example, FIG. 5 shows an opening to a negative pressure cavity sufficient to contain the dual transducing gaps of a preferred thin-film head 52 rather than a wound ferrite head. In the case of a dual-gap stabilizer, it has been found that somewhat better pull-down performance is obtained by having the epoxy 28 (28') completely seal one end of the cavity 23 (23'). Conversely, such a complete seal is unnecessary for a single-gap stabilizer; indeed, vents are provided through the epoxy 28 (28') if it should happen to seal the cavity 23 (23'). It may prove advantageous to offset the stabilizing device 18 and 18' slightly in a radial direction so that there is a slight radial offset in the head gaps 32 (32') to prevent flux interaction. With the single (or dual) tracks consequently offset from one side to the other in the radial direction, there may be greater immunity to crosstalk.

The invention has been described in detail with particular reference to a presently preferred embodiment, but it will be understood that variations and modifications can be effected within the spirit and scope of the invention. For example, although it is feasible to have the stabilizer devices 18 and 18' far enough apart so as to permit insertion and ejection of the jacket 10 (as shown in FIG. 6), it may be desirable to permit one or both of the stabilizer devices to swing away from each other when the jacket is inserted and removed. In such a case, the stabilizer devices would be immobilized in fixed relation during recording and/or playback (as shown in FIGS. 6-8 and FIG. 10).

What is claimed is:

1. Apparatus for accessing both sides of a storage medium, said apparatus comprising:
   a drive spindle for supporting the medium for rotation about a drive axis;
   first and second transducers;

means for supporting said transducers in fixed relation on opposite sides of the medium so that a fixed separation is established therebetween that is substantially greater than the transducing cross-section of the medium; and means for establishing relative movement between said drive spindle and said supporting means to bring the apparatus into either of two playing positions, the first playing position disposing the medium in operative relation with the first transducer and fte second playing position disposing the medium in operative relation with the second transducer.

2. Apparatus as claimed in claim 1 in which said drive spindle is supported on a carriage for movement relative to said transducer and said means for establishing relative movement moves said carriage so that said drive spindle and the medium therewith move axially of said drive axis between the two playing positions.

3. Apparatus as claimed in claim 1 in which said means for supporting said transducers comprises a yoke for supporting said first and second transducers in fixed relation on opposite sides of the disk, and said means for establishing relative movement moves said yoke between the two playing positions such that in the first playing position said yoke is disposed so that said first transducer is in operative relation with the medium and such that in the second playing position said yoke is disposed so that said second transducer is in operative relation with the medium.

4. Apparatus for accessing both sides of a storage medium contained in a jacket of a predetermined thickness, said apparatus comprising:
a drive spindle for supporting the medium for rotation about a drive axis;
first and second transducers;
means for supporting said transducers in fixed relation on opposite sides of the medium so that a fixed separation is maintained therebetween that is greater than the thickness of the jacket; and
means for establishing relative movement between said drive spindle and said supporting means to interface a selected one of said transducers with the medium.

5. Apparatus as claimed in claim 4 in which said drive spindle is supported for movement axially of said drive axis and said means for establishing relative movement translates said drive spindle bidirectionally so that said selected transducer interfaces with the medium.

6. Apparatus as claimed in claim 4 in which said means for supporting said transducers in fixed relation comprises a yoke supported for movement axially of said drive axis and said means for establishing relative movement translates said yoke bidirectionally so that said selected transducer interfaces with the medium.

7. Apparatus for accessing both sides of a storage medium, said apparatus comprising:
a drive spindle for supporting the storage medium for rotation about a drive axis;
first and second transducers supported relative to opposite sides of the medium; and
means for moving said drive spindle and the medium therewith axially of said drive axis between two playing positions, the first playing position disposing the medium in operative relation with said first transducer and the second playing position disposing the medium in operative relation with said second transducer.

8. Apparatus as claimed in claim 7 further comprising a carriage for supporting said drive spindle for movement relative to said transducers, and said moving means comprises a motor for driving the carriage between the two playing positions.

* * * * *

Notice of Adverse Decisions in Interference

In Interference No. 102,592, involving Patent No. 4,887,176, T. E. Dussinger, J. M. Riley, G. J. Kosarko, DOUBLE-SIDED MAGNETIC RECORDING DEVICE SUPPORTING TWO TRANSDUCERS IN A FIXED RELATION, final judgment adverse to the patentees was rendered Mar. 24, 1992, as to claims 1, 2, 4, 5, 7 and 8.

*(Official Gazette August 25, 1992.)*